US012693180B2

(12) United States Patent
Guglielmi

(10) Patent No.: US 12,693,180 B2
(45) Date of Patent: Jul. 28, 2026

(54) METHOD AND APPARATUS FOR SENSING A LOAD

(71) Applicant: Strongholds Tech LLC, Akron, OH (US)

(72) Inventor: Antonio Guglielmi, Akron, OH (US)

(73) Assignee: Strongholds Tech LLC, Akron, OH (US)

( * ) Notice: Subject to any disclaimer, the term of this patent is extended or adjusted under 35 U.S.C. 154(b) by 289 days.

(21) Appl. No.: 18/598,209

(22) Filed: Mar. 7, 2024

(65) Prior Publication Data

US 2024/0344908 A1 Oct. 17, 2024

Related U.S. Application Data

(60) Provisional application No. 63/495,427, filed on Apr. 11, 2023.

(51) Int. Cl.
| | |
|---|---|
| *G01L 1/22* | (2006.01) |
| *B60P 7/06* | (2006.01) |
| *B60P 7/08* | (2006.01) |
| *G01L 5/101* | (2020.01) |
| *G01L 5/102* | (2020.01) |

(52) U.S. Cl.
CPC .............. *G01L 1/22* (2013.01); *B60P 7/0861* (2013.01); *G01L 5/101* (2013.01); *G01L 5/102* (2013.01)

(58) Field of Classification Search
CPC ....... B60P 7/0861; B60P 7/0823; B60P 7/083; B60P 7/0838; G01L 5/04; G01L 5/045; G01L 5/047; G01L 5/10; G01L 5/101; G01L 5/102
See application file for complete search history.

(56) References Cited

U.S. PATENT DOCUMENTS

| | | | | |
|---|---|---|---|---|
| 8,506,220 | B2 * | 8/2013 | Morland | B60P 7/0861 |
| | | | | 340/440 |
| 10,717,381 | B2 * | 7/2020 | Chu | B60P 7/0861 |
| 11,993,199 | B2 * | 5/2024 | Schultz | G01L 5/10 |
| 2012/0260740 | A1 * | 10/2012 | Huguenot | B60P 7/0861 |
| | | | | 73/826 |
| 2013/0162420 | A1 * | 6/2013 | Stoddard | B60P 7/0861 |
| | | | | 340/425.5 |

(Continued)

FOREIGN PATENT DOCUMENTS

| | | | | |
|---|---|---|---|---|
| DE | 102013006486 A1 * | 9/2014 | | B60P 7/0861 |

*Primary Examiner* — Herbert K Roberts
(74) *Attorney, Agent, or Firm* — Sand, Sebolt & Wernow Co., LPA

(57) ABSTRACT

A load-sensing detector based on a force-sensing resistor embedded within a flexible water-resistant housing. The detector utilizes a small electronics module to provide data communications with an associated mobile app or other remote device. The load-sensing detector may be utilized in conjunction with one or more securement members, such as a tie-down device, ratcheting strap, or the like and may be movable or adaptable for use with varying size, type and location of the load being secured. Further, the load-sensing detector may provide real-time feedback to an operator via a smart device to enable active operation and monitoring of the load's status. The monitoring includes updates to a user to indicate whether or not the load is still present and, if so, if the load remains at a same relative level as compared to an initial point of loading.

18 Claims, 11 Drawing Sheets

(56)        References Cited

U.S. PATENT DOCUMENTS

| | | | | |
|---|---|---|---|---|
| 2017/0267159 | A1* | 9/2017 | Bruhn | G08B 21/182 |
| 2019/0001863 | A1* | 1/2019 | Taylor | H04W 4/70 |
| 2022/0146341 | A1* | 5/2022 | Wenzel | G01L 5/107 |
| 2022/0242302 | A1* | 8/2022 | Goetz | B60P 7/0869 |
| 2024/0041348 | A1* | 2/2024 | Sacks | G01L 1/205 |
| 2026/0036479 | A1* | 2/2026 | Dong | B60P 7/0861 |

* cited by examiner

METHOD AND APPARATUS FOR SENSING A LOAD

REFERENCE TO RELATED APPLICATIONS

This application claims the benefit of U.S. Provisional Patent Application Ser. No. 63/495,427, filed Apr. 11, 2023, the entire disclosure of which is incorporated herein by reference.

TECHNICAL FIELD

The present disclosure relates generally to a load-sensing detector. More particularly, one embodiment of the present disclosure is directed to a sensor for use in conjunction with a tie-down device in order to detect the presence and movement of a load during transportation thereof. Specifically, another embodiment of the present disclosure relates to a force-sensing resistor embedded within a flexible water-resistant housing and which is operable to detect the presence of a load and movement thereof during transportation and/or storage of items in the load.

BACKGROUND ART

Commercial grade shipping and transport applications typically have dedicated systems in place to secure articles or a load for transportation. This is particularly true for applications which include a truck or trailer as the transportation medium. If articles or a load are to be transported within or on a truck tractor trailer, it is necessary to secure the articles in load in place so that they are prevented from moving within or on the trailer. In some instances, for example, integrated strap systems may be utilized to hold articles or a load in place. The integrated strap systems may include tension monitors or other similar devices to monitor the secured load.

In consumer grade shipping and transport situations, many load securing devices and mechanisms utilize cargo tie-downs and restraints which may be prone to loosening during transportation or may fail because of human error in improperly securing the load and/or because the load shifts during transport.

A consumer loading a private vehicle or smaller cargo transport vehicle such as pickup trucks, vans, box trucks, or the like may utilize tie-down devices such as ratcheting straps, cam straps, ropes, chains, cargo nets, or other similar style devices. Similarly, some vehicles including dedicated delivery vehicles, may employ cargo nets or other types of load-securing devices which are "one size fits all" devices. These "one size fits all" devices do not necessarily prevent loads from shifting or moving during transportation but instead are designed to simply attempt to restrain loads within a certain area of the vehicle.

Currently all of these methods and devices of securing loads, particularly at the consumer or individual level are secured using an eyeball test wherein the person securing the load simply tightens the strap until in looks or appears to be sufficiently tightened or secured over the load. If such loads are not properly secured to the vehicle, they may become a hazard for the vehicle's occupants or for others if the securing devices become loose and articles shift within the vehicle or fall from the vehicle during travel over the roads. A shifting load may alter the center of gravity of the vehicle and can make the vehicle unstable and prone to tipping over or rolling under certain conditions. Articles falling off transportation vehicles can pose a hazard to pedestrians and other drivers who are in the vicinity of the transporting vehicle.

At the commercial level, a limited number of devices exist to provide feedback to the driver and/or to the person securing the load. However, many of these devices are integrated into the transporting vehicles themselves. Such devices may include tension monitors and/or position sensors which are engaged on the load and/or are integrated into load securing straps. At the consumer level no such feedback devices exist. Adapting commercial grade sensors and systems provided on commercial vehicles into consumer vehicles may be cost prohibitive and relatively difficult to accomplish.

Existing solutions in the commercial sphere typically provide feedback to the person securing the load. These devices do not provide feedback to the driver of the commercial vehicle in real-time. Thus, it is common that the first time a driver of a commercial vehicle becomes aware that the load has shifted or that articles have fallen off the vehicle is after an incident has already occurred or after they have stopped their vehicle for some reason such as refueling or reaching their delivery destination. Alternatively, the driver may only become aware that the load securing devices have loosened and are no longer adequately securing the load after an incident has become large enough to catch the driver's attention. For example, if the load has shifted on a trailer, the trailer may begin to fish-tail and the vehicle may become difficult to steer or control. Often, at this point, it is too late for the driver to prevent further damage and/or injury to persons and/or property in the area. A consumer transporting furniture, for example, may not notice that the load is improperly secured until a large item, such as a couch or appliance, tips, falls over or otherwise shifts inside the vehicle or until the consumer arrives at a destination to notice the furniture has been damaged between the point of origin and the final destination.

A further limitation of commercial systems, as mentioned above, again involves the fact that commercial systems are often integrated into the vehicles and are not transferable to other vehicles or are able to be utilized with different loads. Consumer level shipping and transport may require more flexible and/or adaptable solutions than are available on commercial vehicles.

SUMMARY OF THE INVENTION

The present disclosure addresses these and other issues by providing a load-sensing detector, such as a detector based on a force-sensing resistor embedded within a flexible, water-resistant body that may further utilize a small electronics module to provide data communications with an associated mobile app or other remote device. The load-sensing detector may be utilized in conjunction with one or more securement members, such as a tie-down device, a ratcheting strap, a chain, or the like and may be movable or adaptable for use with varying size, type and location of the load being secured. Furthermore, the present load-sensing detector may provide real-time feedback to allow active monitoring of the load status including updates to a user to indicate whether or not the load is still present on a transportation vehicle and remains unmoved relative to the load's original position.

In one aspect, an exemplary embodiment of the present disclosure may provide a load-sensing detector comprising a body adapted to be engaged with a securement member for securing a load that is to be monitored; at least one force-sensing resistor provided on the body; and an electronics module provided on the body, said electronics module having at least one transceiver therein which is operable to communicate load position data to a remote device.

In one embodiment, the at least one transceiver may be operable to communicate load position data to the remote device in real time. In one embodiment, the body of the load-sensing detector may be fabricated from a flexible material. In one embodiment, the body may be fabricated from a material that is one or more of water-resistant, water-repellent and resistant to Ultra-Violet (UV) radiation. In one embodiment, the body may define a channel therethrough, wherein the channel has an opening at either end and is configured to receive the securement member therethrough. In one embodiment, the at least one force-sensing resistor is flexible. In one embodiment, the at least one force-sensing resistor may be embedded within the body. In one embodiment, the load-sensing detector may further comprise an indicator provided on an exterior surface of the body, wherein the indicator identifies a placement on an exterior surface of the at least one force-sensing resistor which is embedded within the body. In one embodiment, the indicator may be one or both of a tactile indicator and a visual indicator. In one embodiment, the indicator may be aligned with the at least one force-sensing resistor.

In one embodiment, the body comprises material which is folded over onto itself and defines a channel therethrough, and wherein the channel is adapted to receive the securement member therethrough. In one embodiment, the load-sensing detector further comprises one or more bands which are secured in two spaced-apart locations to the body, wherein a channel may be defined between the two spaced-apart locations and an exterior surface of the body, and wherein the channel is adapted to receive the securement member therethrough.

In one aspect, an exemplary embodiment of the present disclosure may provide a method of sensing a load comprising engaging a load-sensing detector on a securement member; securing at least one piece of cargo in position with the securement member; positioning the load-sensing detector against the at least one piece of cargo; activating the load-sensing detector; and determining, with the load-sensing detector, one or more of movement of the at least one piece of cargo, loosening of the securement member, and reduction in a size of the at least one piece of cargo.

In one embodiment, the method may further comprise detachably engaging the load-sensing detector to the securement member. In one embodiment, the method may further comprise positioning a force-sensing resistor of the load-sensing detector between the securement member and the at least one piece of cargo. In one embodiment, the method may further comprise connecting the load-sensing detector to a remote smart device. In one embodiment, the method may further comprise zeroing a force-sensing resistor of the load-sensing detector. In one embodiment, the method may further comprise providing a channel through a flexible body of the load-sensing detector; and inserting the securement member through the channel. In one embodiment, the method may further comprise providing a flexible force-sensing resistor on the flexible body of the load-sensing detector; and positioning the securement member proximate the flexible force-sensing resistor. In one embodiment, the method may further comprise conforming a flexible body of the load-sensing detector to a region of the exterior surface of the at least one piece of cargo.

In one aspect, an exemplary embodiment of the present disclosure may provide a load-sensing detector comprising a body defining a channel therethrough; at least one force-sensing resistor within the body and being operable to interact with at least one securement member extending through the channel; and an electronics module having at least one transceiver therein operable to communicate load position data to a remote device.

In another aspect, an exemplary embodiment of the present disclosure may provide a method of sensing a load comprising securing at least one piece of cargo in position with at least one securement member; positioning a body of a load-sensing detector on the securement member against the at least one piece of cargo; aligning the body of the load-sensing detector to place a force-sensing resistor within the body between the at least one piece of cargo and the securement member; connecting the load-sensing detector to a remote device; zeroing the force-sensing resistor; and monitoring movement of the at least one piece of cargo with the force-sensing detector and the remote device.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
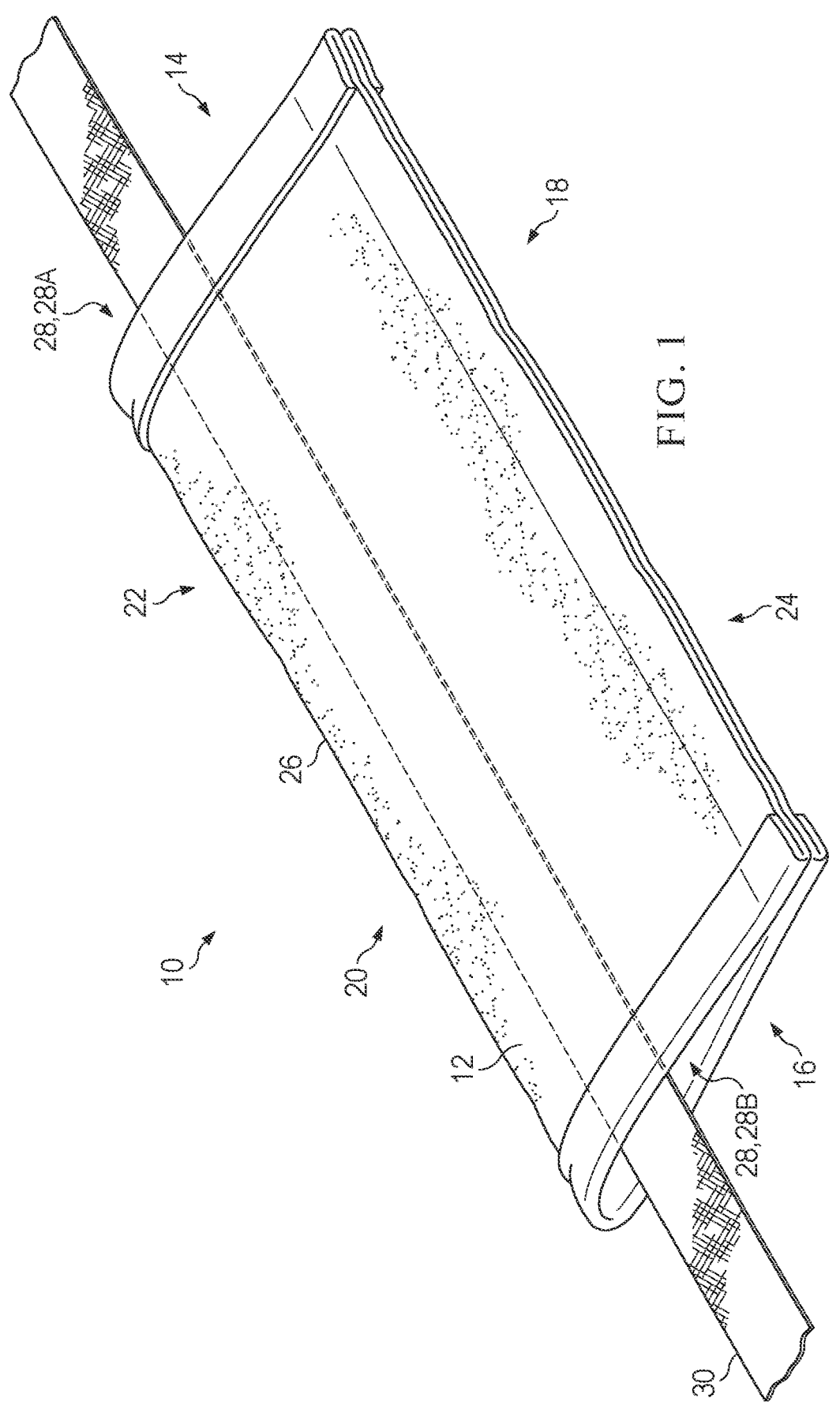
FIG. 1 is a top, left side perspective view of a first embodiment of a load-sensing detector according to one aspect of the present disclosure.
Figure 2:
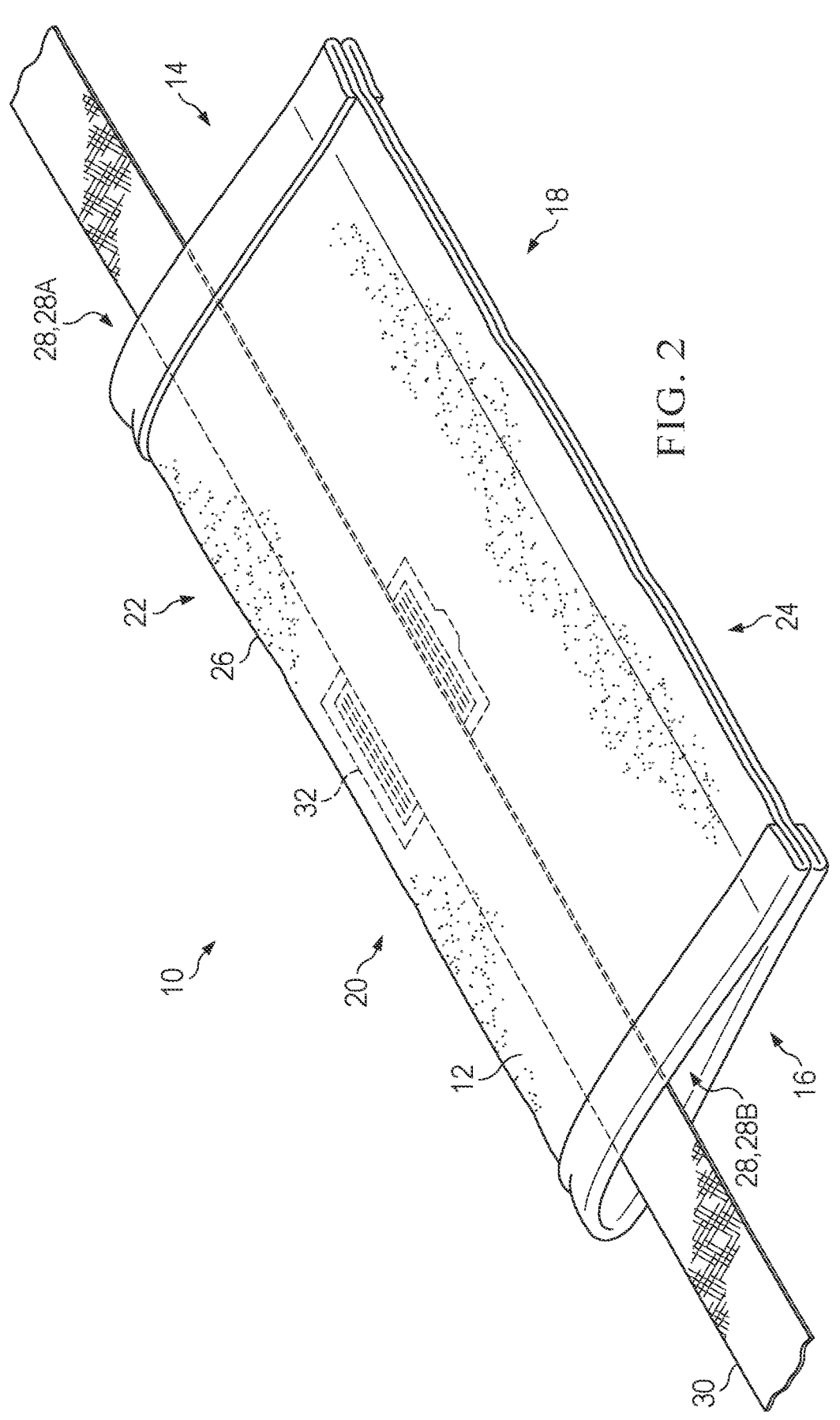
FIG. 2 is a top, left side perspective view of the first embodiment of the load-sensing detector and a sensor according to one aspect of the present disclosure.
Figure 3:
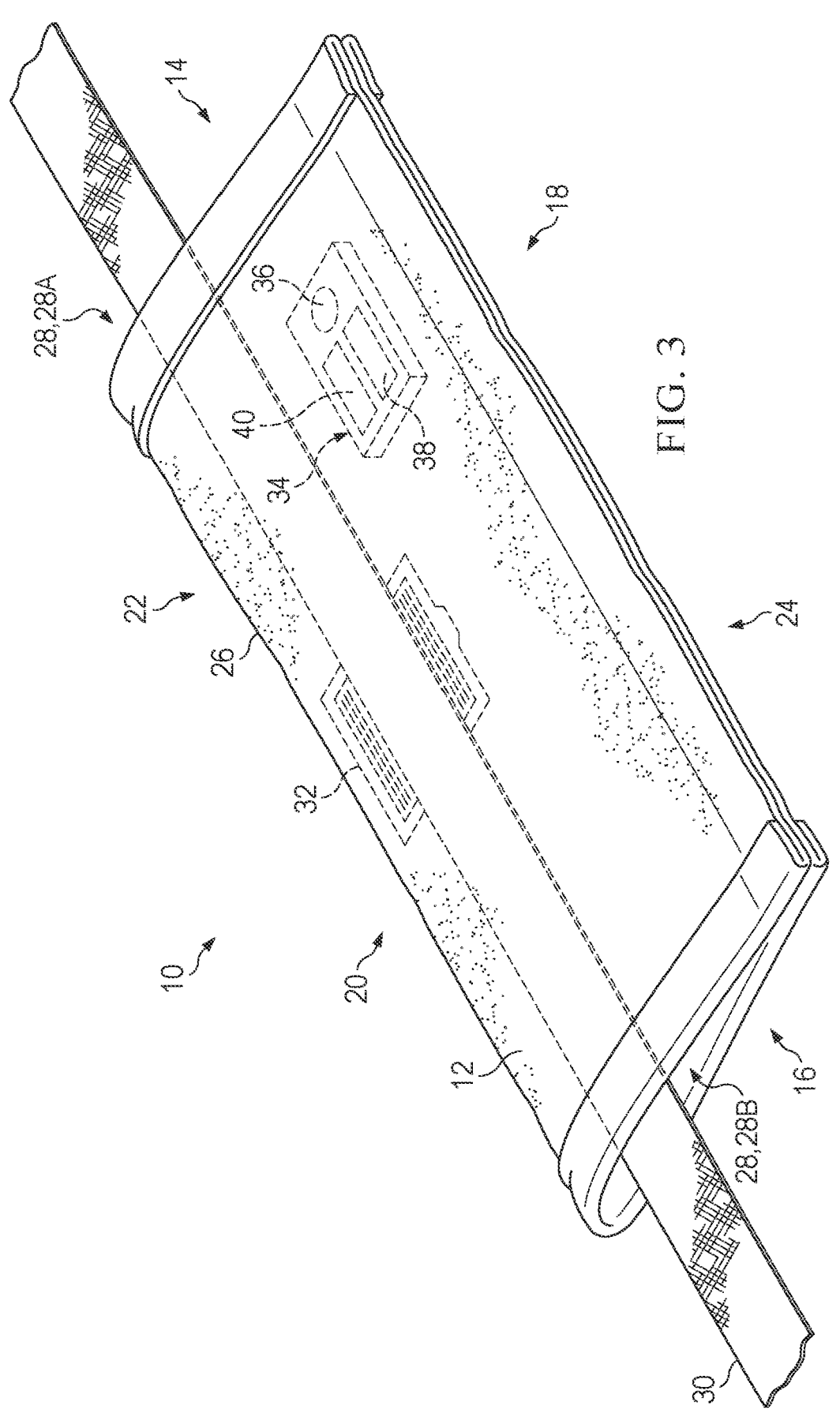
FIG. 3 is a is a top, left side perspective view of the first embodiment of the load-sensing detector, a sensor and an electronics module according to one aspect of the present disclosure.

FIGS. 1-3 show a first embodiment of a load-sensing detector in accordance with an aspect of the present disclosure, generally indicated at 10. Load-sensing detector 10 includes a body 12 which has a first end 14 spaced apart from a second end 16, and defining a longitudinal direction therebetween. Body 12 further includes a first side 18 spaced apart from a second side 20, and defining a transverse direction therebetween. Body 12 further includes a top 22 spaced apart from a bottom 24, and defining a vertical direction therebetween. It should be understood that terms such as "longitudinal direction", "lateral direction", "vertical direction", "top", and "bottom" are used herein to identify the body 12 as shown in the specific orientation illustrated in FIGS. 1-3. These general directions and descriptive terms should not be used to narrowly interpret and construe the configuration of the load-sensing detector 10 in orientations other than shown in the figures and in actual use.

Body 12 of load-sensing detector 10 is fabricated or formed from a single piece of material or from multiple pieces of material. In one embodiment, the material utilized for body 12 is a flexible material. According to one aspect of the disclosure, body 12 is formed or constructed from a water-resistant or water-repellent material. The water-resistant or water-repellent material may be flexible. The body 12 may further be formed from a UV resistant material. The UV resistant material may be flexible and/or water-repellant or water-resistant. Body 12 may be formed of any suitable material which may be treated or otherwise coated with a water repellant and/or with a UV resistant coating. Stated differently, the material selected for fabrication of body 12 is particularly suitable for use in an outdoor environment where the body 12 may be subjected to getting wet or being exposed to the sun. The provision of a treatment or coating which makes body 12 one or both of water-resistant/water-repellent and UV resistant, therefore aids in prolonging the life of the body 12 and preventing damage to load-sensing detector 10 through exposure to water or ultra-violet radiation.

It will be understood that in other embodiments (not shown herein), the material for fabricating body 12 may be relatively rigid and/or inflexible. In other embodiments, the material may not be water-resistant or water repellent. In yet other embodiments, the material may not be UV resistant. It will further be understood that in other embodiments, the material, whether flexible or inflexible, water-resistant, water-repellent and/or UV resistant, the material may have other features that make body 12 suitable for use in an outdoor environment. For example, the material may have anti-microbial properties to prevent the fabric from deteriorating over time.

Load-sensing detector 10, and body 12 thereof, is contemplated to be suitable for use in any weather conditions having ambient temperatures ranging from about −20 degrees Celsius (−4 degrees Fahrenheit) up to about +50 degrees Celsius (+122 degrees Fahrenheit). Load-sensing detector 10, and body 12 thereof, is furthermore constructed and configured to be watertight when exposed to rain, snow, and ice. Similarly, load-sensing detector 10, and body 12 thereof, is contemplated to be UV resistant as they may be exposed to direct sunlight for extended periods of time. As mentioned above, these water-resistant and UV resistant properties may be inherent in the material selected for construction of body 12 or these properties may be provided to the body 12 by applying appropriate coatings to the material thereof. The particular materials and properties may be dictated by the desired end implementation thereof.

Some suitable materials selected for construction of body 12 include, but are not limited to, canvas, nylon, neoprene, and the like or to any suitable combinations of these materials. Where body 12 includes seams or joints between multiple pieces of material and/or layers of material, suitable fasteners may be utilized to secure these pieces or layers together. Suitable fasteners include, but are not limited to, stitching, adhesives, heat-welding, snaps, buttons, rivets, and the like.

As illustrated in FIGS. 1-3, the material forming body 12 is folded about a longitudinal fold 26 which forms multiple layers of material in body 12. When the material of body 12 is folded about longitudinal fold 26, an interior channel 28 is defined between an upper layer and a lower layer of the body. The upper layer and lower layer of the material of body 12 may be secured together in a region remote from fold 26. The securement between the upper layer and lower layer may take any suitable form. For example, the layers may be permanently stitched to one another or hook and loop fasteners or other disengageable securements may be utilized so that the free ends of the upper and lower layers may be selectively separable from one another if desired to access an interior of body 12. An opening 28A to interior channel 28 is provided at first end 14 of the body 12 and an opening 28B to interior channel 28 is provided at second end 16 of body 12. A securement member which is used to secure a load in position on a vehicle or the like is able to be operatively engaged with the body 12. One suitable type of securement member which can be engaged with the body 12 is a strap 30 of a tie-down device. Strap 30 is is able to be inserted through this interior channel 28 as shown in the figures and as discussed further below. In particular, the strap 30 is able to be inserted into the interior channel 28 through either of the openings 28A, 28B and exits the channel 28 through the other of the openings 28A, 28B. A section of the strap 30 will be received and retained within interior channel 28 in a location between fold 26a and the region of body 12 where the upper and lower layers of material are secured to one another. The remaining length of the strap 30 extends for a distance outwardly beyond the first end 14 and second end 16 of body 12.

While the securement member disclosed herein is configured as a strap, it will be understood that in other embodiments other types of securement members may be operatively engaged with body 12 of load-sensing detector 10. For example, a chain may be utilized instead of the strap 30. The term "strap" as used herein should be understood to be representative of any suitable device which may be utilized to secure a load in place.

As shown in phantom in FIG. 2, load-sensing detector 10 further includes one or more force-sensing resistors 32 (hereinafter referred to as "FSR" of "FSR 32") on body 12. FSR 32 may be any suitable FSR as dictated by the desired end use of load-sensing detector 10. According to one aspect, FSR 32 may be a discrete printed FSR. The discrete printed FSR may include additional circuitry and/or be wired to an electronics module 34 such as that shown in phantom in FIG. 3 and as discussed further below. According to another aspect, FSR 32 may be an in-mold electronic sensor printed on an inner wall of an electronics module 34, which may be overmolded to include any suitable electronics components, as discussed below, alongside and in direct connection with terminals of the FSR 32. According to another aspect, a smart, textile-fabric-based FSR 32 may be utilized in load-sensing detector 10. This textile-fabric-based FSR32 may be in direct connection with electronics module 34 or may be separate therefrom and have an in-wired connection therewith as dictated by the desired implementation of load-sensing detector 10.

Regardless of which type of FSR 32 is utilized in load-sensing detector 10, it is contemplated that the FSR 32 is flexible in nature and is positioned within the body 12 of load-sensing detector 10, as shown in FIGS. 2 and 3. In particular, FSR 32 is located on body 12 in such a location that the strap 30 of an associated tie-down device passes directly over the FSR 32 when strap 30 is inserted through and retained in interior channel 28. This will be discussed later herein in relation to the operation of load-sensing detector 10. When FSR 32 is enclosed within the fabric which makes up the body 12 of the load-sensing detector 10, FSR 32 may be provided with a tactile or visual location indicator on an exterior surface of body 12. In particular, the tactile or visual indicator is aligned with a location of the FSR 32 embedded within the interior of the body 12 so that an operator can use their fingers or there eyes to ensure the FSR 32 is aligned with the strap 30 when the load-sensing detector 10 is engaged therewith. The tactile indicator may comprise an area on the exterior surface of the body 12 which is textured differently to the rest of the body 12, or is raised or depressed relative to the rest of the body 12. The visual indicator may comprise an area of a different color provided on the exterior surface relative to the rest of the exterior surface. The visual indicator may, alternatively be any kind of indicia including text instructions, visual representations, logos etc. which differentiate the region of the body located in alignment with the FSR 32 so that the operator can be sure the strap 30 of a tie-down device is situated directly over the FSR 32. The tactile or visual location indicator on body 12 therefore helps a user/operator to properly locate and align load-sensing detector 10 for operational use as discussed later herein.

For implementations in consumer level transportation, the load-sensing FSR 32 may be configured or selected to for use on light-duty to medium-duty loads where utilizing traditional, tension-based monitoring solutions are not cost effective or are physically restricted due to load placement, vehicle type, and the like.

With continued reference to FIGS. 1-3, but with particular reference to FIG. 3, electronics module 34 may be included within load-sensing detector 10 as mentioned above. Electronics module 34 is contemplated to be or otherwise include a power component (not shown) such as a battery or a solar powered component. According to one aspect, the electronics module 34 may any suitable battery or solar powered component including but not limited to, a coin cell battery, a removable battery, a rechargeable internal battery, or the like. According to another aspect, where a rechargeable battery is utilized, electronics module 34 may include a solar cell or a USB-C style charging port as desired.

Electronics module 34 further includes a power button 36 which is utilized to power on and power off the load-sensing detector 10. The power button 36 may, for example, be a push-type button. The power button 36 may include a tactile or visual feedback indicator to indicate the power status. The tactile or visual feedback indicator may include, but is not limited to a vibration, an indicator light, or the like. Electronics module 34 further includes a printed circuit assembly (PCA) (not shown). The PCA may be a standard circuit assembly having any required or necessary components and circuitry thereon. PCA may further include any processors or the like as is necessary for the functioning of load-sensing detector 10, and may further include one or more transceivers 38 and one or more auxiliary accessories 40.

Transceiver 38 on electronics module 34 may be a standard transceiver including an antenna and one or more processors operable to transmit and/or receive a radio signal.

Figure 11:
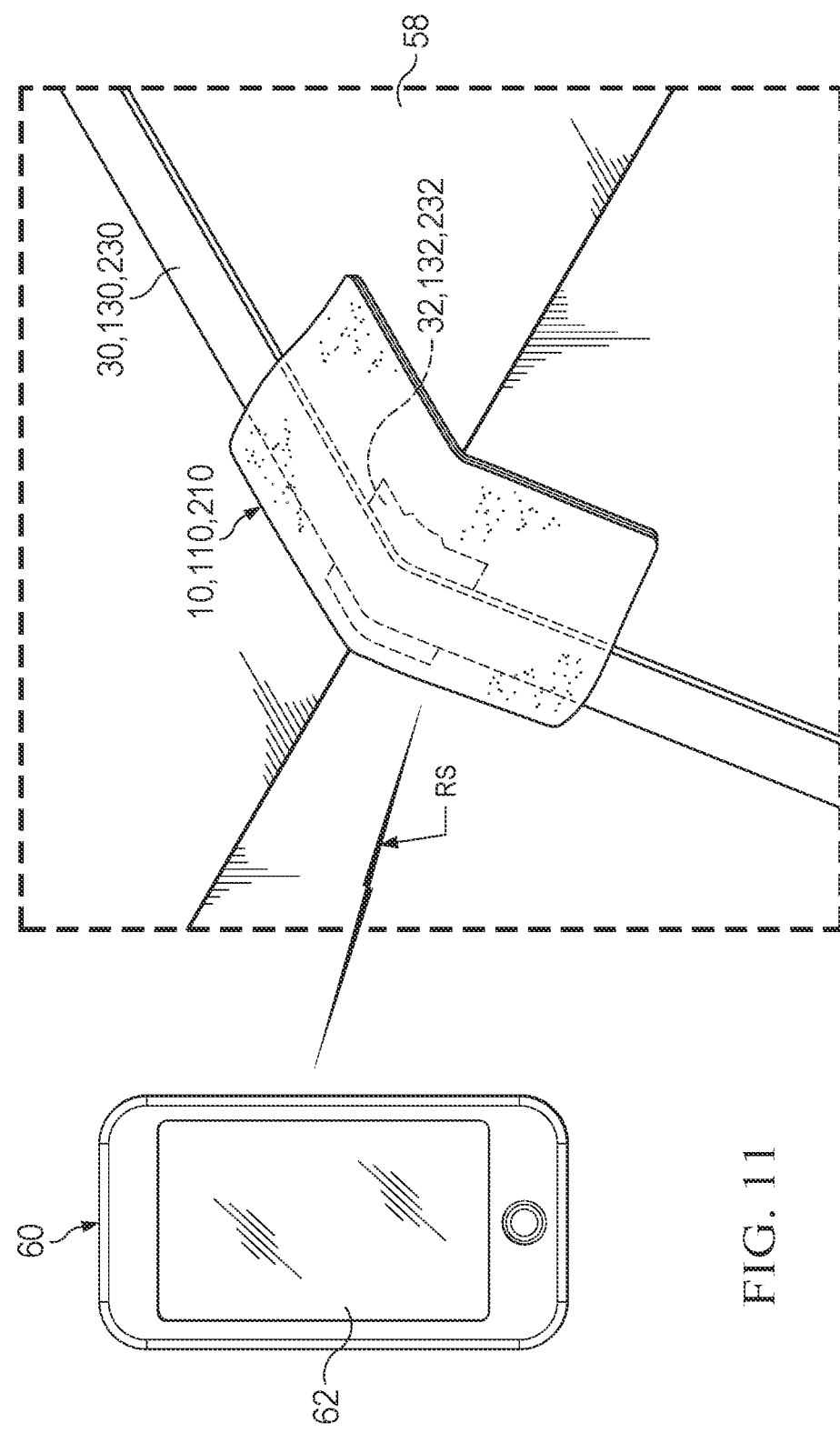
FIG. 11 is an enlarged, partial, operational view of the load-sensing detector as illustrated in FIG. 10.

According to one aspect, transceiver 38 may be a BLUETOOTH® low energy radio that may relay data wirelessly to an associated device (such as smart device 60 shown in FIG. 11). According to another aspect, transceiver 38 may be operable to send and receive wireless data through any suitable wireless transmission protocol as dictated by the desired implementation of load-sensing detector 10.

Auxiliary accessory 40 may be any other desired electronic component as dictated or determined by the desired implementation of load-sensing detector 10. According to some non-limiting embodiments, auxiliary accessory 40 may be one or more additional transceivers, solar cells, memory modules, including fixed and/or removable memory such as an SD card or the like, or may be any other suitable electronic component as desired.

Although shown in FIG. 3 as a rectangular module remote from FSR 32, it will be understood that electronics module 34 may take any suitable shape and/or have any suitable placement as desired. According to one aspect, electronics module 34 may be circular or elliptical in shape to accommodate a coin cell battery or the like or may be integrated with FSR 32 as discussed previously herein. Similarly, the placement of electronics module 34 on load-sensing detector 10 may vary. Electronics module 34 may be placed internally within body 12 of load-sensing detector 10 or, alternatively, electronics module 34 may be affixed to an external surface of body 12 for ease of access. Placing electronics module 34 on the body's external surface will, for example, make it easier for a person to access the electronics module 34 in order to charge or replace the batteries utilized in electronics module 34.

Figure 4:
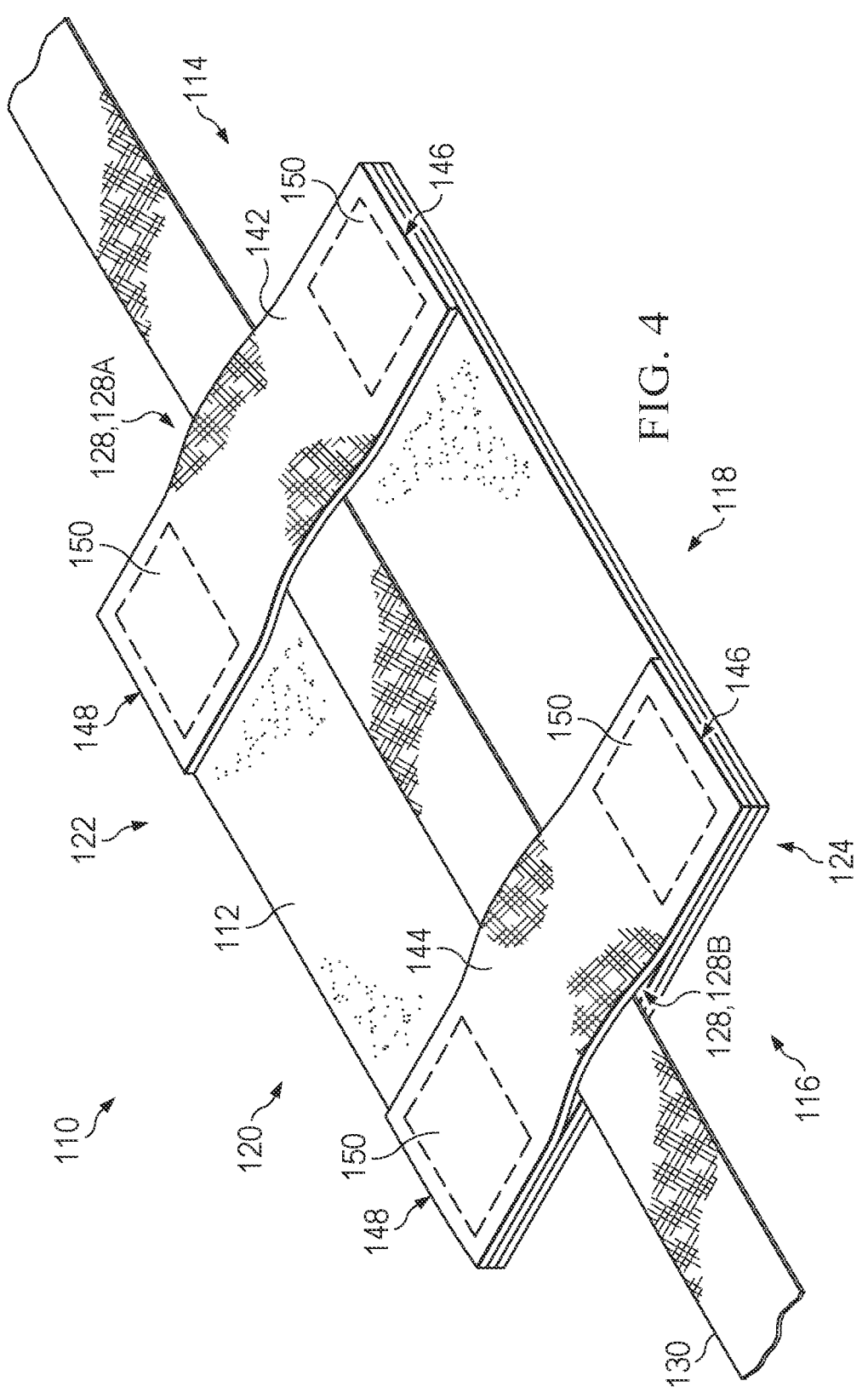
FIG. 4 is a top, left side perspective view of a second embodiment of a load-sensing detector according to one aspect of the present disclosure.
Figure 5:
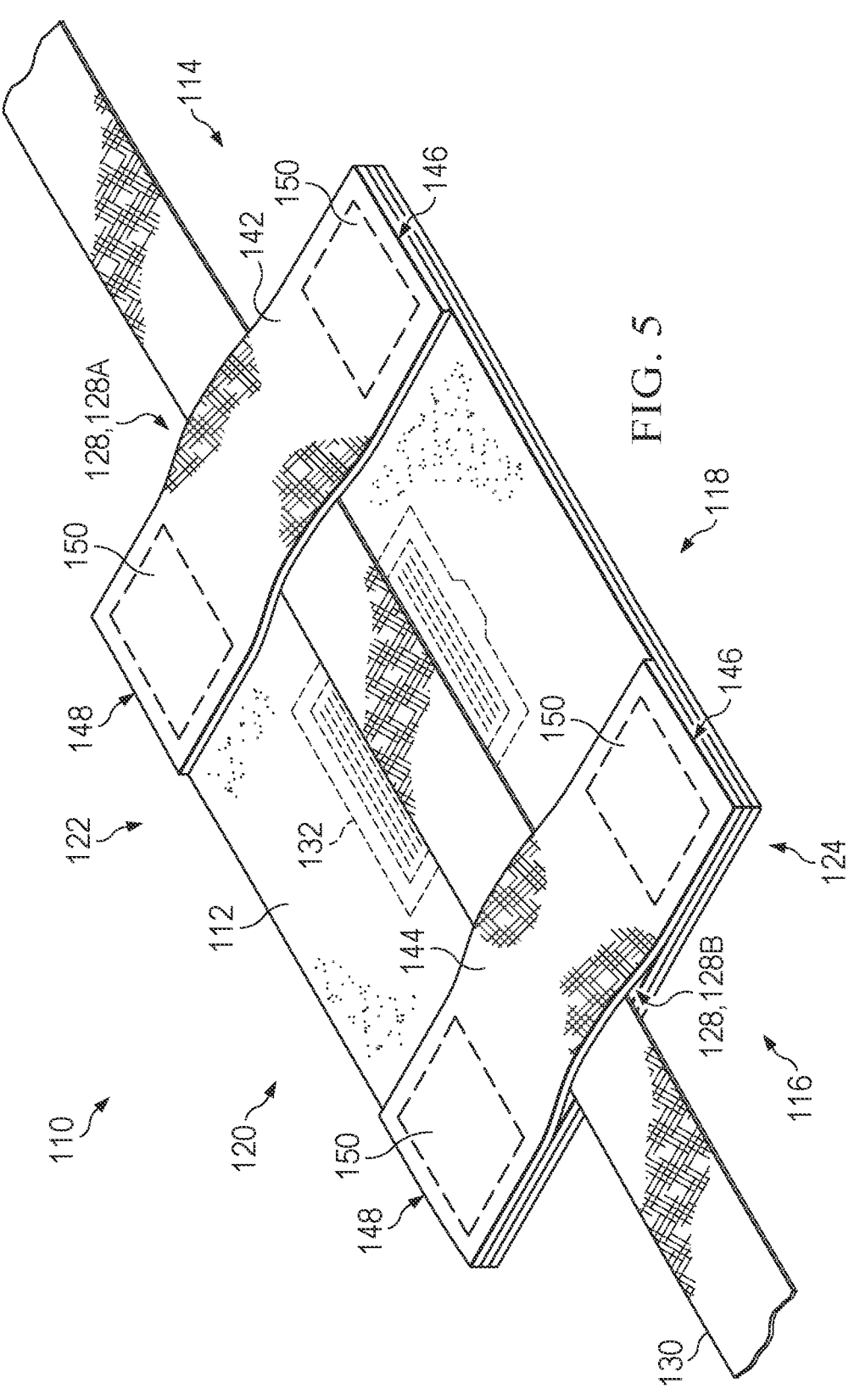
FIG. 5 is a top, left side perspective view of the second embodiment of the load-sensing detector and a sensor according to one aspect of the present disclosure.
Figure 6:
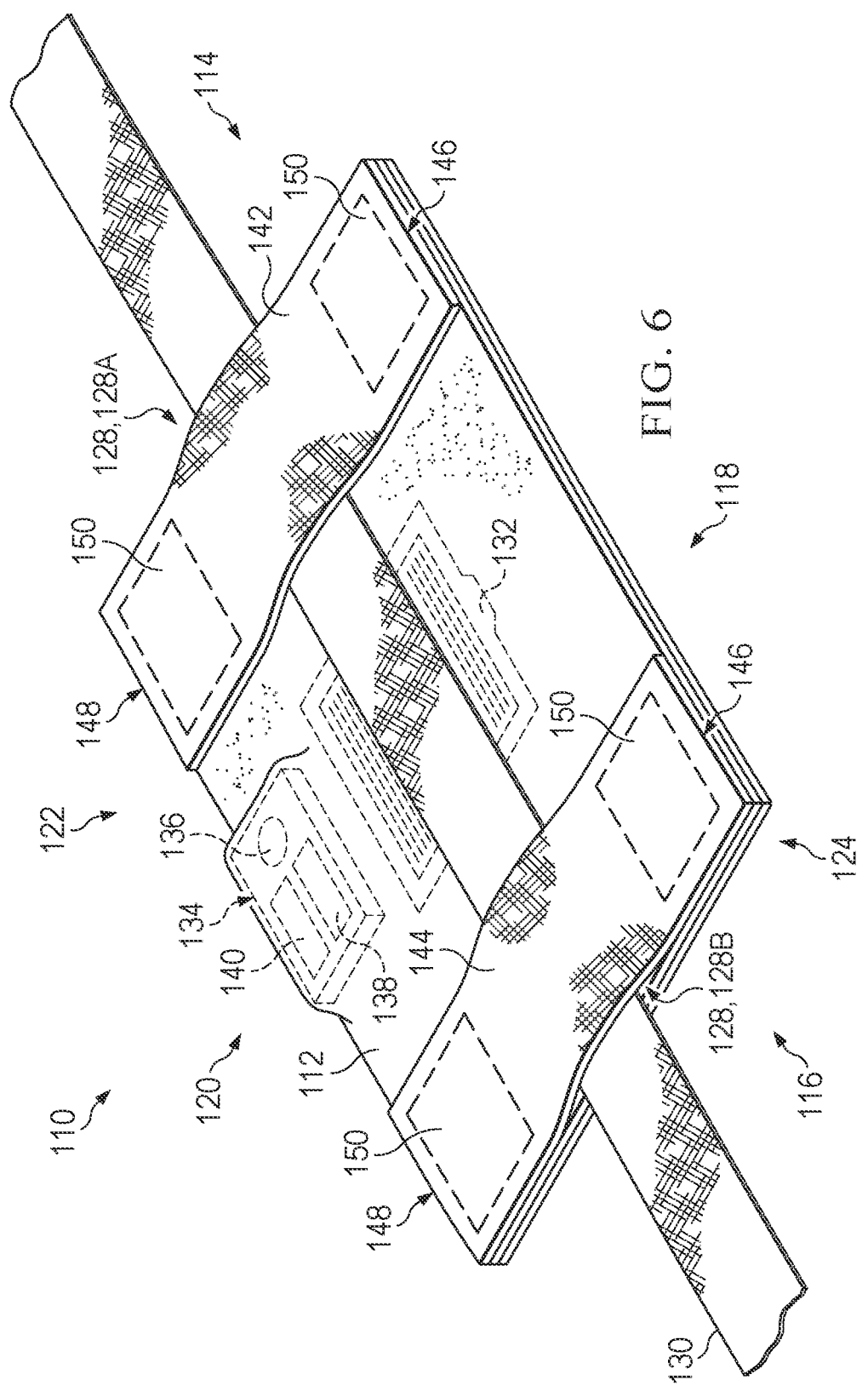
FIG. 6 is a top, left side perspective view of the second embodiment of the load-sensing detector, a sensor and an electronics module according to one aspect of the present disclosure.

With reference now to FIGS. 4-6 a second embodiment of a load-sensing detector in accordance with the present disclosure is shown and is generally indicated at reference 110. Load-sensing detector 110 is substantially similar to load-sensing detector 10 in that detector 110 includes a body 112 having a first end 114 spaced longitudinally apart from a second end 116; a first side 118 spaced transversely apart from a second side 120; and a top 122 spaced vertically apart from a bottom 124. Body 112 may be fabricated from a substantially identical material to body 112. The body 112 of detector 110 may differ from body 12 of detector 10 in that the body 112 is fabricated from a plurality of layers of material that are stacked one on top of the other instead of from one or more layers that are folded over one another.

Load-sensing detector 110 further differs from load-sensing detector 10 in that load-sensing detector 110 includes a first band 142 and a second band 144 which are fixedly secured to at least an uppermost layer of the stack of material. First and second bands 142, 144 each include a first end 146 which is located proximate first side 118 of body 112 and a second end 148 which is located proximate the second side 120 of body 112. Straps 142 and 144 are stitched or otherwise secured to the material of body 112 in such a manner that the straps 142, 144 are fixedly and non-removably secured to the material of body 112 and such that at least a portion of each strap 142, 144 is not secured to the material of the body 112. Straps 142, 144 may, for example, be stitched or otherwise secured to body 112 at the designated areas indicated by reference number 150 in FIG. 4. Because of the location of the stitching, a channel 128 is defined between the uppermost layer of material of body 112 and the underside of each strap 142, 144 . . . . The channel 128 is accessible through an opening 128A defined at first end 114 of body 112 and/or through an opening 128B defined in second end 116 of body 112. A strap 130 of an associated tie-down device is able to be inserted through one of the openings 128A, 128B and to exit the other of the openings 128A, 128B. A length of strap 130 is thereby received and retained within the interior channel 128 of body 112 and abuts the uppermost layer of the material of body 112. A remaining length of the strap 130 extends outwardly beyond the first end 114 and second end 116 of body 112.

As with load-sensing detector 10, load-sensing detector 110 includes a force-sensing resistor 132 (hereafter "FSR 132") provided on body 112. FSR 132 is substantially identical in structure and function to FSR 32. FIG. 5 shows that the FSR 132 is located between the layers of material utilized to fabricate body 112. In particular, FSR 132 is embedded under the uppermost layer of material of body 112. The location of FSR 132 under the uppermost layer of material is such that the strap 130 will pass directly over the FSR 132 when strap 130 is received through channel 128. Load-sensing detector 110 may further include an electronics module 134 (FIG. 6). Electronics module 134 is substantially identical in structure and function to electronics module 34 discussed previously herein. Electronics module 134 is shown in FIG. 6 to be located beneath the uppermost layer of the material of body 112 but in a location which makes it easier to access the electronics module 134 if the battery thereof needs to be changed or recharged. In particular, electronics module 134 is located immediately adjacent second side 120 of body 112.

Figure 7:
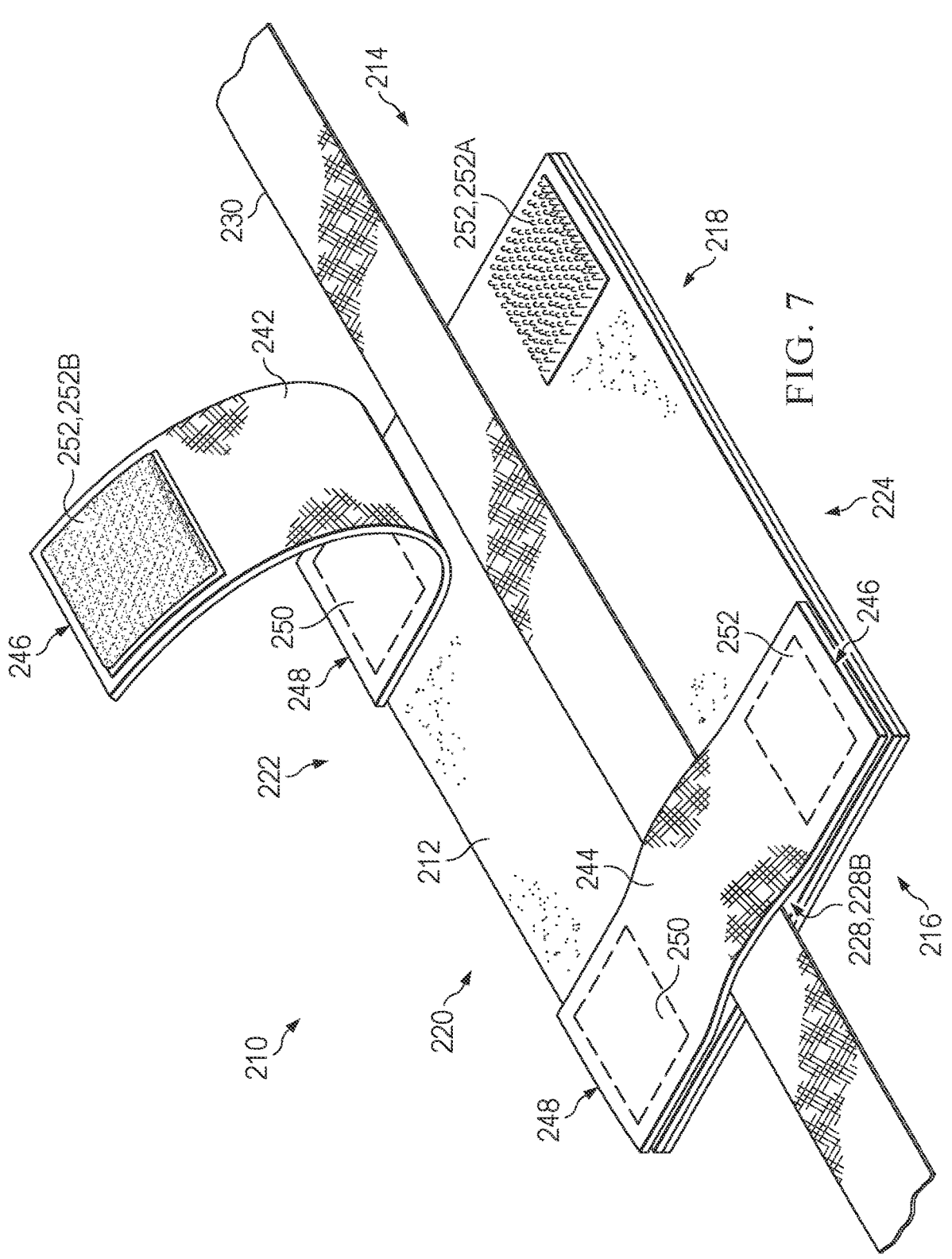
FIG. 7 is a top, left side perspective view of a third embodiment of a load-sensing detector according to one aspect of the present disclosure.
Figure 8:
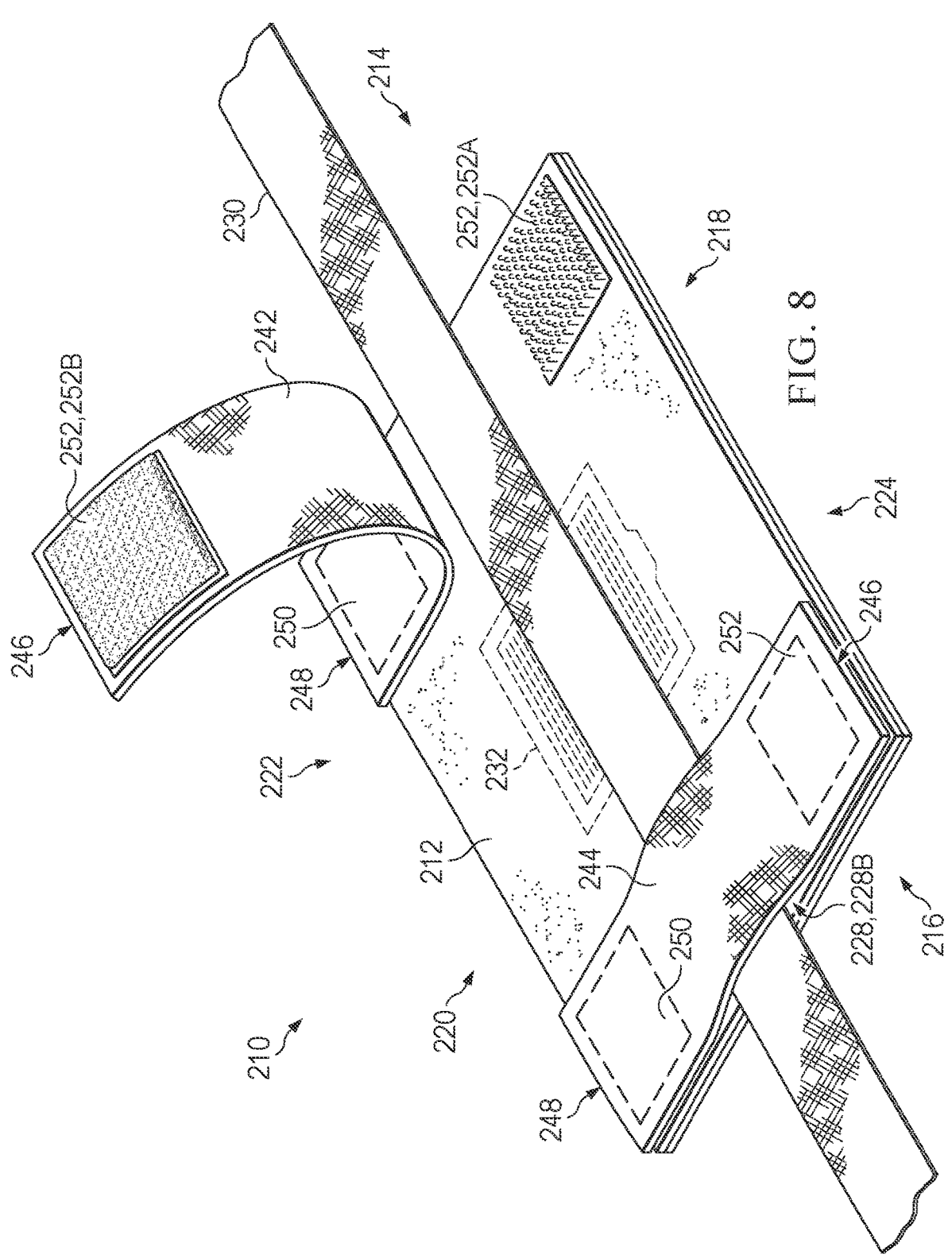
FIG. 8 is a top side isometric perspective view of the third embodiment of the load-sensing detector and a sensor according to one aspect of the present disclosure.
Figure 9:
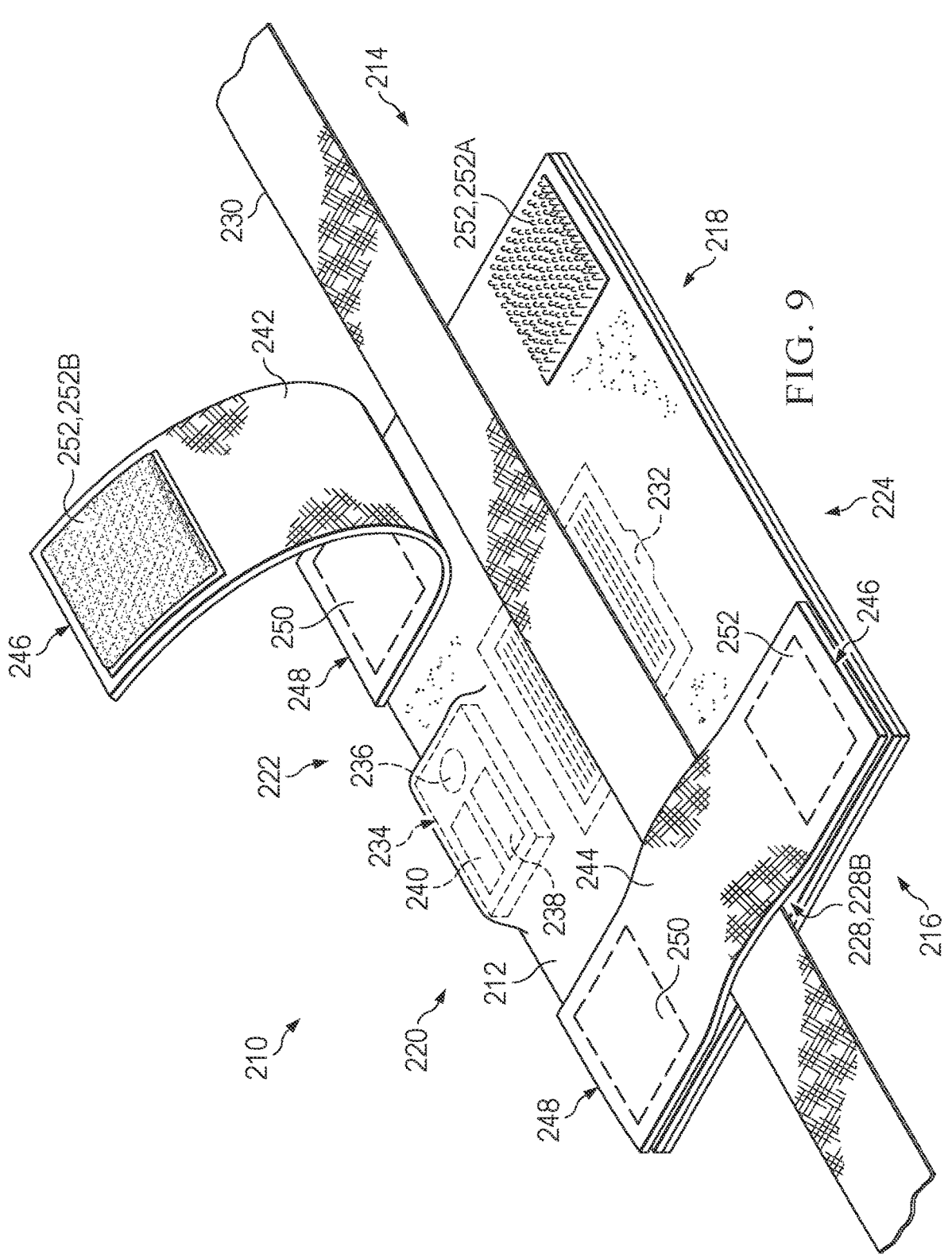
FIG. 9 is a top, left side perspective view of the third embodiment of the load-sensing detector, a sensor and an electronics module according to one aspect of the present disclosure.

With reference now to FIGS. 7-9 a third embodiment of a load-sensing detector in accordance with the present disclosure is shown and is indicated at reference number 210. Load-sensing detector 210 is substantially identical to load-sensing detector 110, except that one end of one or both of a first band 242 and a second band 244 is detachably secured to the uppermost layer of material forming body 212. At least one end of one or both of first band 242 and second band 244 is detachably secured to the uppermost layer of the material of body 212, proximate a first side 216 thereof. For example, a detachable fastener, such as a hook and loop closure 252, is utilized to secure first ends 246 of first and second bands 242 and 244 to the uppermost layer of material of body 212. In particular and as illustrated in FIG. 7, the hook and loop closure may have a piece of hook material 252A provided on first band 242 (and second band 244) is located opposite a piece of loop material 252B located on the uppermost layer of the body material. The detachably fastener allows for removable engagement of one end of one or both of the first and second bands 242, 244 with body 212 and thereby allowing for easier placement of a load strap 230 within a channel 228 formed between the straps 242, 244 and the uppermost layer of material of the body 212. The other end of one or both of the first band 242 and second band 244 is fixedly secured to the uppermost layer of material of body 212 by stitching 248, 250 or by another permanent-type fastener such as an adhesive or rivets. Fixedly securing one end of each strap 242, 244 and detachably securing the other end of each strap 242, 244 ensures that body 212 will remain engaged with strap 230 during use. It will be understood that both ends 246, 248 and the straps 242, 244 may be detachably engaged with the uppermost layer of the material of body 212. However, this arrangement is slightly less desirable as there may be a risk the straps 242, 244 may completely disengage from the uppermost material of the body 212.

Load-sensing detector 210, like load-sensing detectors 10 and 110, includes a FSR 232 (FIG. 8) and furthermore may include an electronics module 234 (FIG. 9). The FSR 232 may be substantially identical in structure and function to FSR 132 or FSR 32. The placement of FSR 232 on body 212 will be substantially identical to the placement of FSR 132 on body 112. Electronics module 234 may be substantially identical to electronics modules 134 or 34. Additionally, the placement of electronics module 234 on body 212 may be substantially identical to the placement of electronics module 134 on body 112.

Having thus described the elements and components of the load-sensing detectors 10, 110, and 210, the operation and use thereof will now be described.

As is evident from the previous description of load-sensing detectors 10, 110, and 210 and the accompanying figures, the main differences between the devices is that of variations in the construction and configuration of the bodies 12, 112, and 212 thereof. The components which comprise the load-sensing detectors 10, 110, 212, are, however, substantially identical and therefore all embodiments of load-sensing detector 10, 110, and/or 210 operate in a substantially identical manner. The operation of load-sensing detector 10 will therefore be described hereafter but it will be understood that load-sensing detectors 110 and 210 operate in a substantially similar manner thereto. The variations in operation of the three detectors 10, 110, 210 are substantially similar except for how the detectors 10, 110, 210 are engaged with straps 30, 130, 230 of an associated tie-down device.

Figure 10:
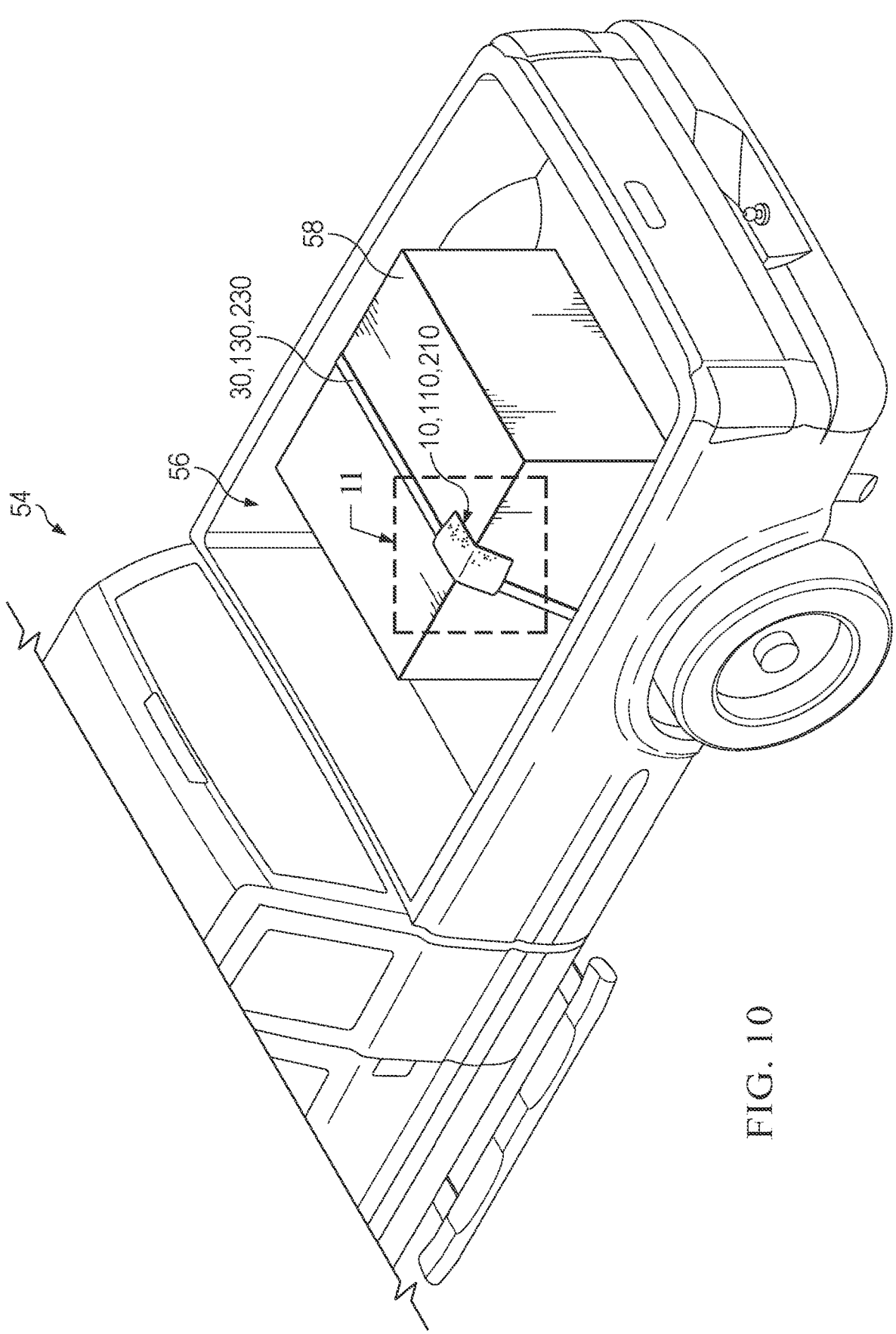
FIG. 10 is an operational view of a load-sensing detector in accordance with one aspect of the present disclosure and shown used to detect possible movement of a secured load being carried in the bed of a vehicle.

With reference to FIGS. 10 and 11, an exemplary use and operation of load-sensing detector 10, 110, 210 is shown and will be described hereafter. FIGS. 10 and 11 show a vehicle 54, such as a pickup truck or other similar personal use vehicle, being utilized to transport a load. Vehicle 54 is illustrated as a pickup truck having a cargo bed or cargo area 56 in which one or more pieces of cargo 58 (i.e., a load) is seated. The figures show a strap 30, 130, 230 for an associated tie-down device being utilized to secure cargo 58 in place. The following description will refer to load-sensing detector 10 and strap 30 but will apply to each of the load-sensing detectors 110, 210 and straps 130, 230.

In accordance with an aspect of the present disclosure, in order to employ load-sensing detector 10 during the transportation of cargo 58 in vehicle 54, the load-sensing detector 10 must first be activated. In particular, load-sensing detector 10 is powered on via the operation of power button 36 (FIG. 3) on electronics module 34. Once powered on, the load-sensing detector 10 may be linked any wireless communications protocol to a smart device. One suitable wireless communications protocol may be BLUETOOTH®. One suitable smart device with each the load-sensing detector 10 may be linked wirelessly is a smartphone 60 or the like as shown in FIG. 11. Once connected to the smart device 60, the load-sensing detector 10 is affixed to a tie-down strap 30 by inserting a free-end of the tie-down strap 30 into either of the openings 28A, 28B to channel 28 of load-sensing detector 10. The strap 30 is threaded through the channel 28, exiting the other of the openings 28A, 28B and the free end is then secured in the usual manner to part of the vehicle to hold the load 58 in place. Before the strap 30 is fully tightened to retain the load 58 in place, the load-sensing detector 10 is moved along the strap 30 and is placed at a point of contact between the strap 30 and load 58. In other words, the load-sensing detector 10 is placed in physical contact with the load 58; the load-sensing detector 10 is not simply "hung" on the strap 30.

As illustrated in FIG. 10, when load-sensing detector 10 is used to monitor a cargo item having a square or rectangular profile, the load-sensing detector 10 may be placed at a corner thereof. When utilized with other shapes of cargo 58 it is contemplated that the load-sensing detector 10 may be placed directly between a part of the strap 30 and the load 58 in such a way as to maximize the area of contact between the detector 10 and the exterior surface of the load 58. Soft goods or cargo that may change shape or be depressed as strap 30 is tightened, such as mattresses or furniture, for example, may require one placement of strap 30 and load-sensing detector 10 for proper contact. For harder goods such as appliances or boxes, on the other hand, the load-sensing detector 10 and strap 30 may be placed in a different area such as at a corner or on a flat portion of the cargo 58. It is further contemplated that load-sensing detector 10 may be utilized on straps 30 which secure curved or irregularly-shaped cargo such as boats, kayaks, sporting equipment, odd-shaped furniture, or the like. In these instances, the load-sensing detector 30 may be placed at any suitable spot between strap 30 and cargo 58 as dictated by the specific use thereof. The flexibility of body 12 and the flexibility of the FSR 32 provided thereon allows the load-sensing detector 10 to conform the shape of a region of the cargo 58 for proper physical contact therewith.

While FIG. 11 shows the smart device 60 as a smart phone, it will be understood that smart device 60 may be any suitable electronic or computing device as dictated by the desired implementation. According to one aspect of the disclosure, smart device 60 may be any suitable device, including custom devices operable on a closed system to communicate with load-sensing detector 10 through a wired connection or wirelessly through BLUETOOTH® low energy wireless transmission protocols. Communication between load-sensing detector 10 and smart device 60 may alternatively occur through other suitable transmission protocols such as Wi-Fi, ZigBee, or any other wireless communications protocol. According to another aspect, smart device 60 may be any suitable standard device other than a smart phone including but not limited to a cellular telephone, PDA, tablet, or similar type device operable to communicate through a wired connection or wirelessly through BLUETOOTH® low energy wireless transmission protocols, or through other suitable transmission protocols such as Wi-Fi, ZigBee, or any other wireless communications protocol. The smart device 60 as illustrated includes a display 62 (FIG. 11). Display 62 serves as an interface between a user and the smart device 60 and enables the user to remotely monitor and control operation of load-sensing detector 10 through two-way radio signals as indicated at reference "RS" in FIG. 11. The signals transfer between the transceiver 38 of electronics module 34 on load-sensing detector 10 and an appropriate transmitter and/or receiver within smart device 60 as dictated by the desired implementation.

Smart device 60 may further include or otherwise allow for operation of a mobile application that receives radio signals "RS" from load-sensing detector 10 to acquire sensor data from the FSR 32 in real-time while utilizing the load-sensing detector 10. The user may initially use the mobile app to zero out or set a baseline for sensor readings once the load-sensing detector 10 is placed between strap 30 and cargo 58. Once the baseline is set, final checks can be made to tighten down the tie-down strap 30 to properly secure the cargo 58 in place, and then again zeroing out or resetting the baseline through the mobile app as necessary.

Once the load-sensing detector 10 is in place and strap 30 is tightly secured with the FSR 32 properly set at the baseline, the vehicle 54 may then be driven to its destination. During transport, real-time data updates will be sent from load-sensing detector 10 to smart device 60 where they there can be displayed to the vehicle operator on the user interface 62. Any instances of load instability will be detected by load-sensing detector 10 and will be relayed to the smart device 60, thus notifying the operator of vehicle 54 in real time that the load 58 has shifted within vehicle 54 and is no longer adequately secured in place by strap 30. The operator will then safely stop the vehicle 54 and will adjust and tighten the strap 30 as needed and will then carry on with their journey to their destination. The load-sensing detector 10 will continue to actively monitor the load 58 in real time until the operator utilizes the smart device 60 to deactivate the load-sensing detector 10 or until the power button on the detector 10 is switched off.

Other similar uses may be realized for load-sensing detector 10 such as monitoring cargo 58 to determine if someone is trying to remove or steal the cargo 58. If the strap 30 securing the cargo 58 is tapered with or is loosened because pieces of the load 58 are being carried off, the load-sensing detector 10 will detect those changes in the position or tension of the strap 30 and will reflect that change on the smart device 60. In some instances, a visual and/or audible alarm may be generated if the load-sensing detector 10 is triggered by a change in strap tension or unexpected reduction in the size of the load 58. If a load 58 is being stored overnight, for example, on a long distance move with an overnight stay, that load 58 may be secured in place with a strap 30 upon which load-sensing detector 10 is engaged. A notification will be sent from the load-sensing detector 10 to the smart device 60 if the load 58 shifts and the detector 10 no longer senses contact with the load 58 and/or if the baseline contact with the cargo 58 changes.

Although described herein in various embodiments it will be readily understood that different configurations and arrangements of load-sensing detector 10, 110, and/or 210 may be determined and utilized by a person of ordinary skill in the art while remaining within the scope of the disclosure herein. For example, the straps may have different fasteners, materials, and/or properties and may or may not include integrated tie-down aspects with the detector. According to other embodiments, similar uses may be realized without deviation from the scope of the disclosure herein.

The device of the present disclosure may additionally include one or more sensors to sense or gather data pertaining to the surrounding environment or operation of the device. Some exemplary sensors capable of being electronically coupled with the device of the present disclosure (either directly connected to the device of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The device of the present disclosure may include wireless communication logic coupled to sensors on the device. The sensors gather data and provide the data to the wireless communication logic. Then, the wireless communication logic may transmit the data gathered from the sensors to a remote device. Thus, the wireless communication logic may be part of a broader communication system, in which one or several devices of the present disclosure may be networked together to report alerts and, more generally, to be accessed and controlled remotely. Depending on the types of transceivers installed in the device of the present disclosure, the system may use a variety of protocols (e.g., Wifi, ZigBee, MiWi, Bluetooth) for communication. In one embodiment, each of the devices of the present disclosure may have its own IP address and may communicate directly with a router or gateway. This would typically be the case if the communication protocol is WiFi.

In another embodiment, a point-to-point communication protocol like MiWi or ZigBee is used. One or more of the device of the present disclosure may serve as a repeater, or the devices of the present disclosure may be connected together in a mesh network to relay signals from one device to the next. However, the individual device in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the device of the present disclosure may differ from embodiment to embodiment. In one embodiment, alerts and signals from the device of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular device of the present disclosure creates an alert because of a data point gathered by one or more sensors, that alert can be sent, in e-mail or SMS form, directly to the individual responsible for fixing it. Of course, e-mail and SMS are only two embodiments of communication methods that may be used; in other embodiments, different forms of communication may be used.

In other embodiments, alerts and other data from the sensors on the device of the present disclosure may also be sent to a work tracking system that allows the individual, or the organization for which he or she works, to track the status of the various alerts that are received, to schedule particular workers to repair a particular device of the present disclosure, and to track the status of those repair jobs. A work tracking system would typically be a server, such as a Web server, which provides an interface individuals and/ organizations can use, typically through the communication network. In addition to its work tracking functions, the work tracker may allow broader data logging and analysis functions. For example, operational data may be calculated from the data collected by the sensors on the device of the present disclosure, and the system may be able to provide aggregate machine operational data for a device of the present disclosure or group of devices of the present disclosure.

The system also allows individuals to access the device of the present disclosure for configuration and diagnostic purposes. In that case, the individual processors or microcontrollers of the device of the present disclosure may be configured to act as Web servers that use a protocol like hypertext transfer protocol (HTTP) to provide an online interface that can be used to configure the device. In some embodiments, the systems may be used to configure several devices of the present disclosure at once. For example, if several devices are of the same model and are in similar locations in the same location, it may not be necessary to configure the devices individually. Instead, an individual may provide configuration information, including baseline operational parameters, for several devices at once.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory. Any of the elements, components, or structures discussed herein may take the form of any shape. Thus, although the figures depict the various elements, components or structures of the present disclosure according to one or more exemplary embodiments, it is to be understood that any other geometric configuration of that element, component or structure is entirely possible.

Various inventive concepts may be embodied as one or more methods, of which an embodiment has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of embodiment only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Embodiments of output devices that can be used to provide a user interface include printers or display screens for visual presentation of output and speakers or other sound generating devices for audible presentation of output. Embodiments of input devices that can be used for a user interface include keyboards, and pointing devices, such as mice, touch pads, and digitizing tablets. As another embodiment, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a module fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting embodiment, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting embodiment, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above embodiment, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this embodiment a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or embodiment of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the embodiments and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are embodiments and the disclosure is not limited to the exact details shown or described.

What is claimed is:

1. A load-sensing detector comprising:
a body adapted to be engaged with a securement member for securing a load that is to be monitored;
at least one force-sensing resistor provided on the body; and
an electronics module provided on the body, said electronics module having at least one transceiver therein operable to communicate load position data to a remote device,
wherein the body and the at least one force-sensing resistor are flexible and thereby configured to conform to a region of an exterior surface of the load that is to be monitored,
wherein the body defines a channel therethrough, and wherein the channel has an opening at either end and is configured to receive the securement member therethrough.

2. The load-sensing detector according to claim 1, wherein the at least one transceiver is operable to communicate load position data to the remote device in real time.

3. The load-sensing detector according to claim 1, wherein the body is fabricated from a flexible material.

4. The load-sensing detector according to claim 1, wherein the body is fabricated from a material that is one or more of water-resistant, water-repellent and resistant to Ultra-Violet (UV) radiation.

5. The load-sensing detector according to claim 1, wherein the at least one force-sensing resistor is embedded within the body.

6. The load-sensing detector according to claim 5, further comprising an indicator provided on an exterior surface of the body, wherein the indicator identifies a placement of the at least one force-sensing resistor embedded within the body.

7. The load-sensing detector according to claim 6, wherein the indicator is one or both of a tactile indicator and a visual indicator.

8. The load-sensing detector according to claim 6, wherein the indicator is aligned with the at least one force-sensing resistor.

9. A load-sensing detector comprising:
a body adapted to be engaged with a securement member for securing a load that is to be monitored;
at least one force-sensing resistor provided on the body; and
an electronics module provided on the body, said electronics module having at least one transceiver therein operable to communicate load position data to a remote device, wherein the body and the at least one force-sensing resistor are flexible and thereby configured to conform to a region of an exterior surface of the load that is to be monitored, wherein the body comprises material which is folded over onto itself and defines a channel therethrough, and wherein the channel is adapted to receive the securement member therethrough.

10. A load-sensing detector comprising:

a body adapted to be engaged with a securement member for securing a load that is to be monitored;

at least one force-sensing resistor provided on the body;

an electronics module provided on the body, said electronics module having at least one transceiver therein operable to communicate load position data to a remote device; and one or more bands which are secured in two spaced-apart locations to the body, wherein a channel is defined between the two spaced-apart locations and an exterior surface of the body, and wherein the channel is adapted to receive the securement member therethrough, wherein the body and the at least one force-sensing resistor are flexible and thereby configured to conform to a region of an exterior surface of the load that is to be monitored.

11. A method of sensing a load comprising:

providing a load-sensing detector comprising:

a body adapted to be engaged with a securement member for securing at least one piece of cargo that is to be monitored; at least one force-sensing resistor provided on the body; an electronics module provided on the body, said electronics module having at least one transceiver therein operable to communicate load position data to a remote device, wherein the body and the at least one force-sensing resistor are flexible and thereby configured to conform to a region of an exterior surface of the at least one piece of cargo that is to be monitored, wherein the body defines a channel therethrough, and wherein the channel has an opening at either end and is configured to receive the securement member therethrough;

engaging the load-sensing detector on the securement member;

securing the at least one piece of cargo in position with the securement member;

positioning the load-sensing detector against the at least one piece of cargo;

activating the load-sensing detector; and determining, with the load-sensing detector, one or more of movement of the at least one piece of cargo, loosening of the securement member, and reduction in a size of the at least one piece of cargo.

12. The method according to claim 11, further comprising detachably engaging the load-sensing detector to the securement member.

13. The method according to claim 11, further comprising positioning the at least one force-sensing resistor between the securement member and the at least one piece of cargo.

14. The method according to claim 11, further comprising connecting the load-sensing detector to a remote smart device.

15. The method according to claim 14, further comprising zeroing the at least one force-sensing resistor of the load-sensing detector.

16. The method according to claim 11, further comprising:

inserting the securement member through the channel.

17. The method according to claim 16, further comprising:

positioning the securement member proximate the flexible force-sensing resistor.

18. The method according to claim 11, further comprising conforming the flexible body of the load-sensing detector to the region of the exterior surface of the at least one piece of cargo.

* * * * *